(12) United States Patent
Lee

(10) Patent No.: US 12,278,391 B2
(45) Date of Patent: Apr. 15, 2025

(54) BATTERY PACK COMPRISING EXTINGUISHMENT UNIT

(71) Applicant: LG ENERGY SOLUTION, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 511 days.

(21) Appl. No.: 17/761,784

(22) PCT Filed: Aug. 19, 2020

(86) PCT No.: PCT/KR2020/011050
§ 371 (c)(1),
(2) Date: Mar. 18, 2022

(87) PCT Pub. No.: WO2021/054625
PCT Pub. Date: Mar. 25, 2021

(65) Prior Publication Data
US 2022/0376354 A1 Nov. 24, 2022

(30) Foreign Application Priority Data

Sep. 19, 2019 (KR) .......................... 10-2019-0115463

(51) Int. Cl.
*H01M 50/383* (2021.01)
*A62C 3/16* (2006.01)
(Continued)

(52) U.S. Cl.
CPC ............ *H01M 50/383* (2021.01); *A62C 3/16* (2013.01); *A62C 37/14* (2013.01);
(Continued)

(58) Field of Classification Search
CPC ... H01M 50/383; H01M 50/211; H01M 50/20
See application file for complete search history.

(56) References Cited

U.S. PATENT DOCUMENTS

| 673,900 | A | * | 5/1901 | Darling | ............... H01M 50/308 |
| | | | | | 429/84 |
| 1,377,227 | A | * | 5/1921 | Spencer | ............... H01M 4/762 |
| | | | | | 429/238 |

(Continued)

FOREIGN PATENT DOCUMENTS

CN  201815034 U  5/2011
CN  203842219 U  9/2014
(Continued)

OTHER PUBLICATIONS

International Search Report (PCT/ISA/210) issued in PCT/KR2020/011050, dated Nov. 27, 2020.
(Continued)

*Primary Examiner* — Kenneth J Douyette
(74) *Attorney, Agent, or Firm* — Birch, Stewart, Kolasch & Birch, LLP

(57) ABSTRACT

A battery pack includes at least one battery module arranged in one direction and having a cell assembly including a plurality of secondary batteries arranged in one direction; and a fire extinguishing unit having a fire extinguishing tank configured to contain a fire extinguishing agent therein, a pipe connected to the fire extinguishing tank to supply the fire extinguishing agent from the fire extinguishing tank to the at least one battery module, and a fire extinguishing valve configured so that, when an internal gas of the battery module is heated over a predetermined temperature, an inner configuration of the fire extinguishing valve is partially deformed by the heated internal gas to open an output hole thereof so as to supply the fire extinguishing agent from the fire extinguishing tank into the battery module.

14 Claims, 14 Drawing Sheets

(51) Int. Cl.
*A62C 37/14* (2006.01)
*H01M 50/211* (2021.01)
*H01M 50/244* (2021.01)

(52) U.S. Cl.
CPC ....... *H01M 50/211* (2021.01); *H01M 50/244* (2021.01); *H01M 2200/10* (2013.01); *H01M 2220/10* (2013.01)

(56) References Cited

U.S. PATENT DOCUMENTS

| | | | |
|---|---|---|---|
| 2007/0164711 | A1 | 7/2007 | Kim et al. |
| 2011/0189511 | A1 | 8/2011 | Yoon |
| 2016/0072118 | A1* | 3/2016 | Park .................. H01H 89/00 429/61 |
| 2017/0043194 | A1 | 2/2017 | Ling |
| 2017/0301867 | A1 | 10/2017 | Kim |
| 2019/0103639 | A1* | 4/2019 | Guglielmo .......... H01M 10/482 |
| 2019/0351268 | A1 | 11/2019 | Lee |

FOREIGN PATENT DOCUMENTS

| | | |
|---|---|---|
| CN | 207368148 U | 5/2018 |
| CN | 110120477 A | 8/2019 |
| DE | 20 2019 102 367 U1 | 5/2019 |
| EP | 4 002 543 A1 | 5/2022 |
| JP | 5-31206 A | 2/1993 |
| JP | 2011-254906 A | 12/2011 |
| JP | 2013-114952 A | 6/2013 |
| JP | 2018-55768 A | 4/2018 |
| KR | 10-2002-0042784 A | 6/2002 |
| KR | 10-2007-0006000 A | 1/2007 |
| KR | 10-2007-0073173 A | 7/2007 |
| KR | 10-2011-0098236 A | 8/2011 |
| KR | 10-2016-0047345- | 5/2016 |
| KR | 20-0486546 Y1 | 6/2018 |
| KR | 10-1970238 B1 | 4/2019 |
| KR | 10-1998279 B1 | 7/2019 |
| WO | WO 2012/015001 A1 | 2/2012 |
| WO | WO 2018/139737 A1 | 8/2018 |

OTHER PUBLICATIONS

Extended European Search Report for European Application No. 20865692.6, dated Nov. 25, 2022.

* cited by examiner

BATTERY PACK COMPRISING EXTINGUISHMENT UNIT

TECHNICAL FIELD

The present disclosure relates to a battery pack including a fire extinguishing unit, and more particularly, to a battery pack having a reduced risk of secondary ignition or explosion.

The present application claims priority to Korean Patent Application No. 10-2019-0115463 filed on Sep. 19, 2019 in the Republic of Korea, the disclosures of which are incorporated herein by reference.

BACKGROUND ART

Secondary batteries commercialized at the present include nickel cadmium batteries, nickel hydrogen batteries, nickel zinc batteries, and lithium secondary batteries. Among them, lithium secondary batteries are in the spotlight due to free advantages such as free charging and discharging by little memory effect compared to nickel-based secondary batteries, and very low self-discharge rate and high energy density.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, namely a battery pouch exterior, for hermetically storing the electrode assembly together with an electrolyte.

Recently, secondary batteries are widely used not only in small devices such as portable electronic devices, but also in middle-sized or large-sized devices such as vehicles and energy storage systems. When used in the middle-sized or large-sized device, a large number of secondary batteries are electrically connected to increase capacity and output. In particular, pouch-type secondary batteries are widely used in the middle-sized or large-sized devices since they may be easily stacked.

Meanwhile, recently, as the need for a large-capacity structure increases along with the use as an energy storage source, the demand for a battery pack including a plurality of secondary batteries electrically connected in series and/or in parallel, and a battery module accommodating the secondary batteries therein, and a battery management system (BMS) is increasing.

In addition, the battery pack generally includes an outer housing made of a metal material to protect or store the plurality of secondary batteries from an external shock. Meanwhile, the demand for high-capacity battery packs is increasing recently.

However, since the conventional battery pack or the conventional battery rack has a plurality of battery modules, if the secondary batteries of each battery module generates thermal runaway to cause ignition or explosion, heat or flame may be transferred to neighboring secondary batteries to cause secondary explosions, so efforts to prevent secondary ignition or explosion are increasing.

Accordingly, a fast and complete fire extinguishing technology to take immediate action when thermal runaway occurs in some secondary batteries in the battery pack or the battery rack is necessary. In addition, there is a need for a method for stably extinguishing fires even if the battery management system is not operating or erroneously operating.

DISCLOSURE

Technical Problem

The present disclosure is designed to solve the problems of the related art, and therefore the present disclosure is directed to providing a battery pack, which reduces the risk of secondary ignition or explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
  at least one battery module having a cell assembly including a plurality of secondary batteries arranged in a first direction; and
  a fire extinguisher having a fire extinguishing tank configured to contain a fire extinguishing agent, a pipe connected to the fire extinguishing tank to supply the fire extinguishing agent from the fire extinguishing tank to the at least one battery module, and a fire extinguishing valve configured so that, when an internal gas of the at least one battery module is heated over a predetermined temperature, an inner configuration of the fire extinguishing valve is partially deformed by the heated internal gas to open an output hole of the fire extinguishing valve to supply the fire extinguishing agent from the fire extinguishing tank into the at least one battery module.

Also, the fire extinguishing valve may include:
  a glass bulb configured to seal the output hole, the glass bulb being at least partially broken to open the output hole when being exposed to the internal gas of the battery module over the predetermined temperature; and
  a disperser configured to disperse the fire extinguishing agent discharged from the output hole.

Moreover, the at least one battery module may include:
  a module housing having an inner space capable of accommodating the cell assembly; and
  a gas passage located inside the module housing and configured to discharge a gas generated from the cell assembly to the outside.

In addition, the glass bulb of the fire extinguishing valve may be located the gas passage.

Further, the at least one battery module may include:
  a blower mounted to a front end of the module housing and configured to introduce external air into the module housing; and
  a gas discharge hole formed at a rear end of the module housing and connected to the gas passage.

Also, the gas passage may include:
  a supply portion located at a first side of the cell assembly and configured to move the external air introduced by the blower to the rear end of the module housing; and a discharge portion located at a second side of the cell assembly and configured to move the external air introduced by the blower to the gas discharge hole.

In addition, at least a part of the fire extinguishing valve may be located in the supply portion or the discharge portion.

Further, the fire extinguishing valve may be located at a rear end of the supply portion of the gas passage and be at least partially inserted into the module housing at a rear of the at least one battery module.

Also, the fire extinguishing valve may be located in a middle of the supply portion of the gas passage and inserted into the module housing at one of a first side and a second side of the at least one battery module.

Moreover, the battery module may include a guide block having an inclined surface for guiding the gas generated from the cell assembly to flow toward an exposed portion of the glass bulb.

In addition, the at least one battery module may include a pipe member having a pipe diameter gradually decreasing in a direction along which the gas flows so that the gas generated from the cell assembly is collected to an exposed portion of the glass bulb.

Further, the fire extinguishing valve may include:
a top portion having the output hole so that the output hole is sealed by the glass bulb;
a connection portion extending from the top portion to cover the glass bulb and configured to fix the glass bulb;
a plurality of dispersing protrusions extending from the disperser so that the fire extinguishing agent discharged from the output hole is dispersed and moved; and
a gas guide extending from the top portion and having a structure widened in at least two of left, right, upper and lower directions.

Also, in another aspect of the present disclosure, there is also provided a battery rack, comprising: the battery pack; and a rack case configured to accommodate the battery pack.

Moreover, in another aspect of the present disclosure, there is also provided an energy storage system, comprising two or more battery racks.

Advantageous Effects

According to an embodiment of the present disclosure, since the battery pack of the present disclosure includes the fire extinguishing unit having the fire extinguishing valve whose internal configuration is partially deformed due to a heated internal gas to open the output hole when the internal gas of the battery module is heated over a predetermined temperature, even if a thermal runaway or fire occurs in some battery modules of the battery pack, the fire extinguishing valve may immediately supply the fire extinguishing agent into the battery module due to the influence of the heated temperature caused by the thermal runaway. In addition, at this time, even if the battery management system erroneously operates, the thermal runaway or fire may be stably extinguished by the fire extinguishing valve, without BMS control, thereby effectively enhancing the safety of the battery pack.

In addition, according to an embodiment of the present disclosure, since the fire extinguishing valve of the present disclosure includes a glass bulb configured to seal the output hole but configured to be at least partially broken when exposed to an internal gas of the battery module over a predetermined temperature to open the output hole and a dispersion unit configured to disperse the fire extinguishing agent discharged from the output hole, it is possible to open the fire extinguishing valve with a fast response speed by the high internal temperature of the battery module where a thermal runaway or fire occurs. Moreover, since the dispersion unit evenly sprays the supplied fire extinguishing agent, the extinguishing ability may be effectively increased.

Moreover, according to an embodiment of the present disclosure, since at least a part of the fire extinguishing valve of the present disclosure is located in a part of the supply portion or the discharge portion, the fire extinguishing valve may easily contact the high-temperature gas pushed by the external air introduced by the blower, thereby exhibiting quick extinguishing ability against a thermal runaway or fire of battery module. Accordingly, the safety of the battery pack may be effectively increased.

Further, according to an embodiment of the present disclosure, since the fire extinguishing valve is located in the middle of the supply portion of the gas passage and inserted into the module housing at one of the left and right sides of the battery module, the fire extinguishing agent may be sprayed to spread in the front and rear direction through the dispersion unit of the fire extinguishing valve. Since the fire extinguishing agent is sprayed evenly in this way, it is possible to effectively prevent a thermal runaway or flame of the cell assembly from propagating.

In addition, according to an embodiment of the present disclosure, since the battery module includes the guide block having the inclined surface that guides the gas generated from the cell assembly to flow while facing the exposed portion of the glass bulb, it is possible to effectively reduce that the contact of the glass bulb of the fire extinguishing valve with the high-temperature gas is disturbed by the connection portion. Accordingly, the fire extinguishing valve may operate with high reliability, and the operating time may be effectively reduced.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
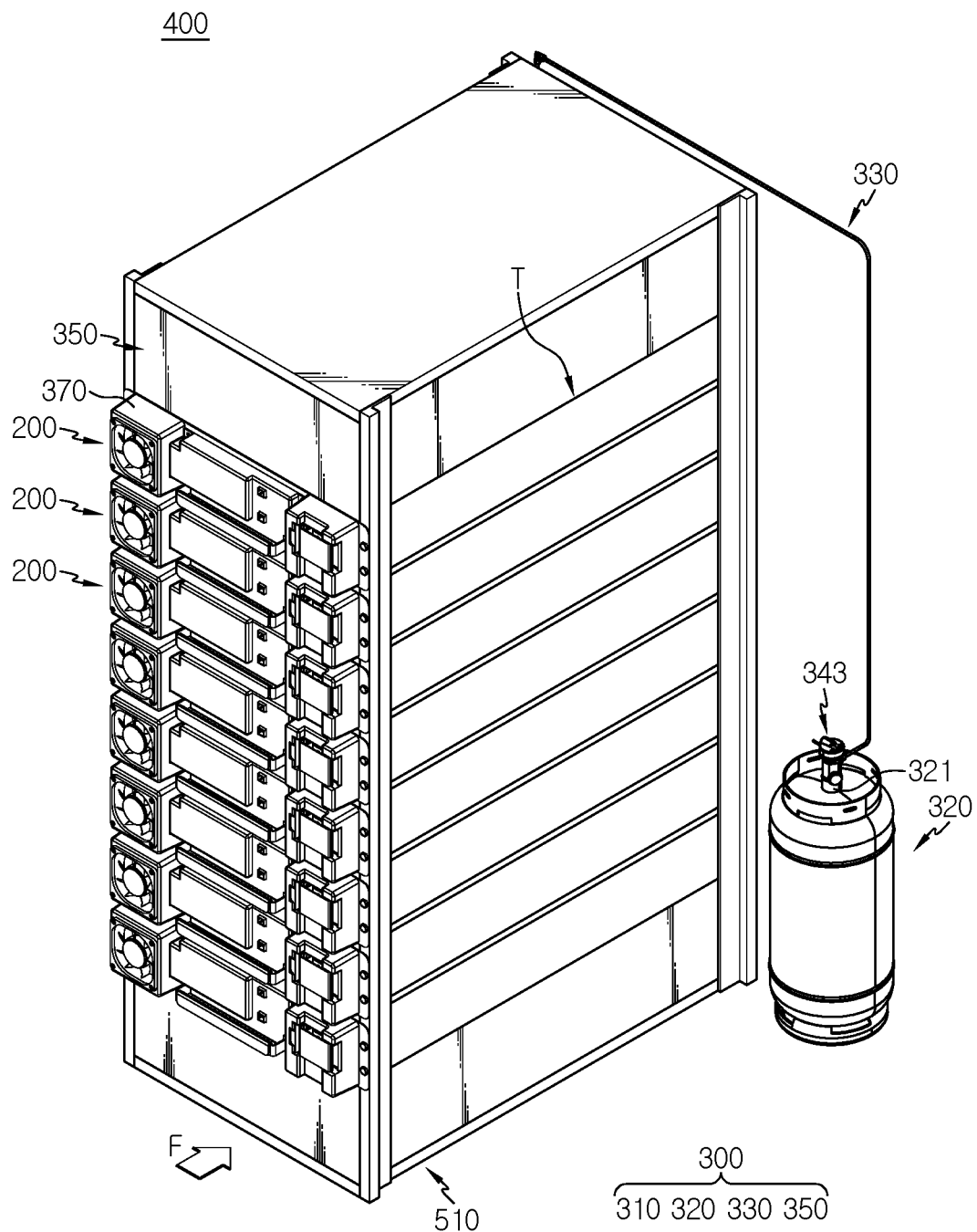
FIG. 1 is a front perspective view schematically showing a battery pack according to an embodiment of the present disclosure.
Figure 2:
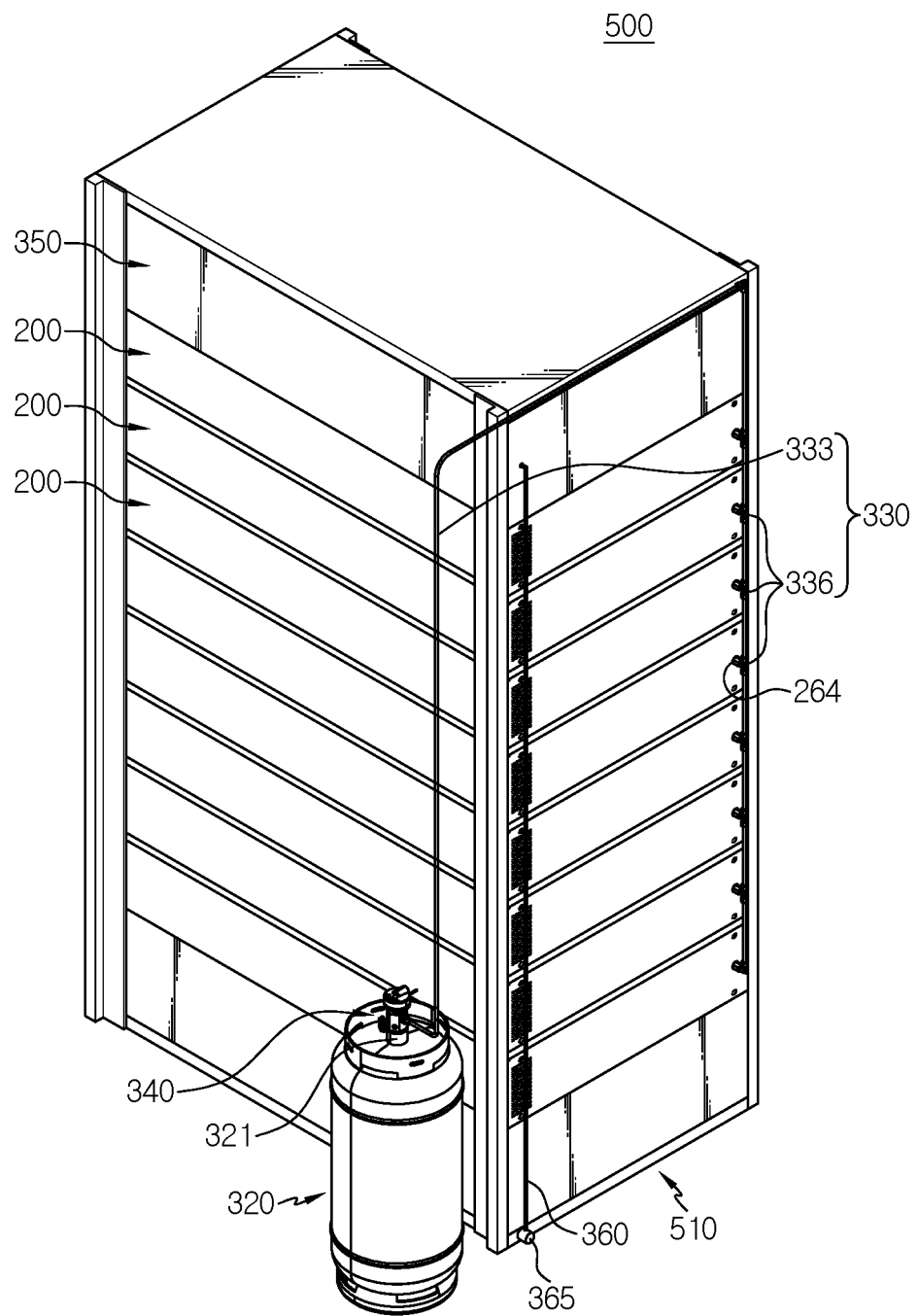
FIG. 2 is a rear perspective view schematically showing the battery pack according to an embodiment of the present disclosure.

FIG. 1 is a front perspective view schematically showing a battery pack according to an embodiment of the present disclosure. FIG. 2 is a rear perspective view schematically showing the battery pack according to an embodiment of the present disclosure. Also, FIG. 3 is a diagram schematically showing components of the battery pack according to an embodiment of the present disclosure.

Figure 3:
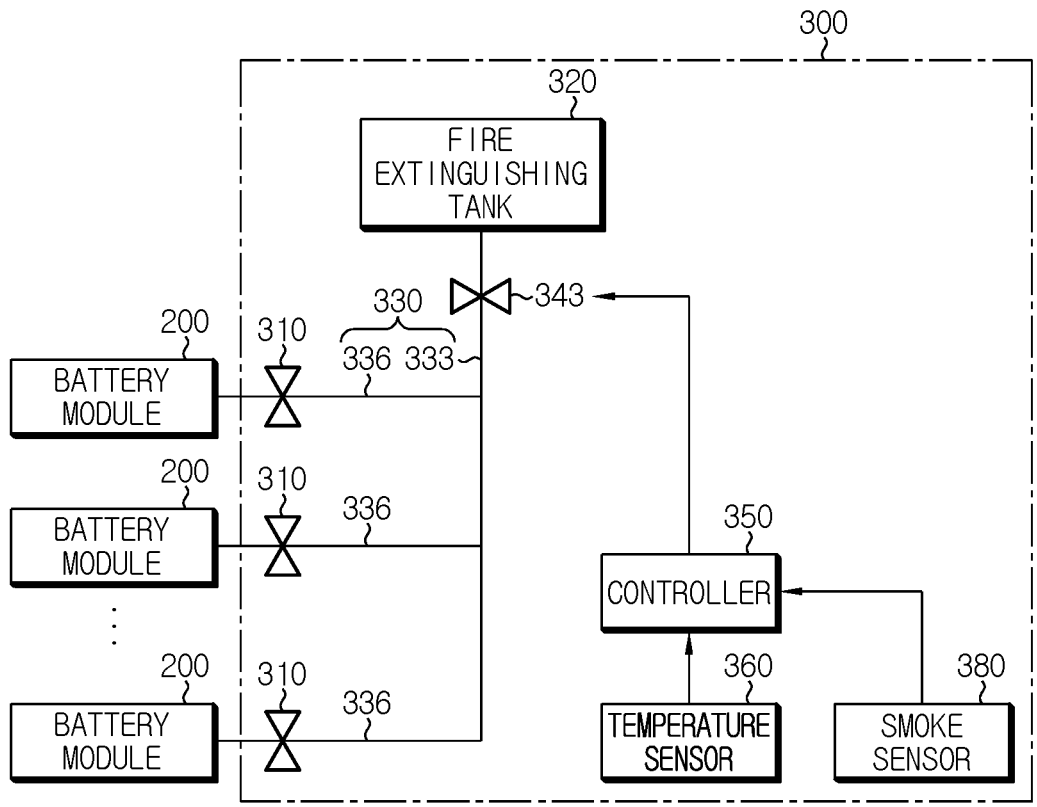
FIG. 3 is a diagram schematically showing components of the battery pack according to an embodiment of the present disclosure.
Figure 5:
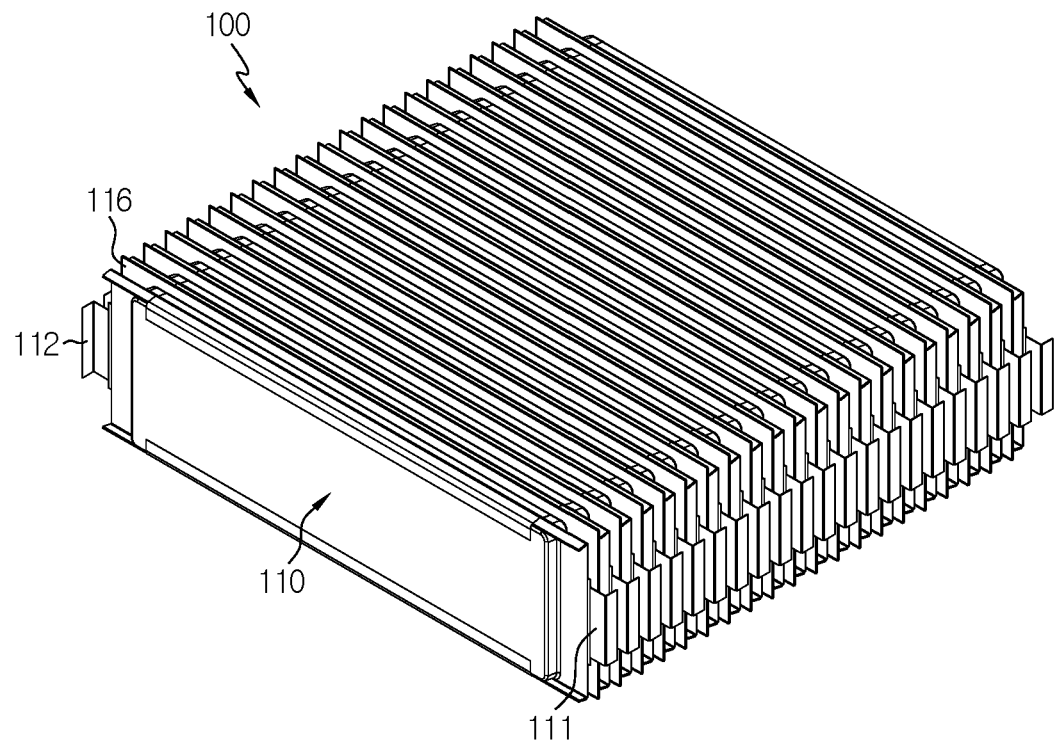
FIG. 5 is a perspective view schematically showing a cell assembly, employed at the battery pack according to an embodiment of the present disclosure.

Referring to FIGS. 1 to 3, a battery pack 400 according to an embodiment of the present disclosure includes at least one battery module 200 arranged in one direction, and a fire extinguishing unit 300 configured to extinguish a fire of the battery module 200. At this time, the battery module 200 may include at least one cell assembly 100 (FIG. 5).

Specifically, the fire extinguishing unit 300 may include a fire extinguishing tank 320, a pipe 330, and a fire extinguishing valve 310.

First, the fire extinguishing tank 320 may contain a fire extinguishing agent (not shown) therein. For example, the fire extinguishing agent may be a concentrated solution of an inorganic salt such as potassium carbonate, a chemical bubble, an air bubble, carbon dioxide, or water. In addition, the fire extinguishing tank 320 may have a compressed gas therein to inject or move the fire extinguishing agent at an appropriate pressure along the pipe 330.

For example, the capacity of the fire extinguishing tank 320 may be 59 L, the compressed gas may be nitrogen of 8 bar, and the fire extinguishing agent may be 40 L of water. Here, if the fire extinguishing agent is water, when the fire extinguishing agent is sprayed into the battery module 200, the fire extinguishing agent has a heat shielding effect together with the fire extinguishing and cooling effect, so it is effective in preventing thermal propagation when high-temperature gas and flame are generated due to thermal runaway. As a result, it is possible to effectively prevent a fire or thermal runaway from propagating among the plurality of battery modules 200.

The pipe 330 may be configured to be connected to supply the fire extinguishing agent from the fire extinguishing tank 320 to each of the at least two battery modules 200. For example, the pipe 330 may be made of a material that is not corroded by water. For example, the pipe 330 may be made of stainless steel. One end of the pipe 330 may be connected to an outlet hole 321 of the fire extinguishing tank 320. The other end of the pipe 330 may have a shape extending to the inside of each of the at least two battery modules 200.

For example, the pipe 330 may include a common pipe 333 connected to the outlet hole 321 of the fire extinguishing tank 320 through which the fire extinguishing agent is discharged, a distribution pipe 336 having a distributed structure to be connected to each of the at least two battery modules 200 from the common pipe 333. For example, as shown in FIG. 2, the pipe 330 may include one common pipe 333 connected to the outlet hole 321 of the fire extinguishing tank 320, and eight distribution pipes 336 branched from the common pipe 333. In addition, the eight distribution pipes 336 may be configured to be connected to eight battery modules 200.

Moreover, the fire extinguishing valve 310 may be configured to supply the fire extinguishing agent from the fire extinguishing tank 320 into the battery module 200 when an internal gas (air) of the battery module 200 is heated over a predetermined temperature. That is, the fire extinguishing valve 310 may include a passive valve (not shown) configured to open an output hole so that the fire extinguishing agent may be injected into the battery module 200 over the predetermined temperature. For example, when the internal temperature of the battery module 200 is over the predetermined temperature, the passive valve may be partially deformed to open the output hole. Moreover, the passive valve may be configured such that its inner configuration is partially deformed by the heat of the heated internal gas to open the output hole. Here, the 'predetermined temperature' may be, for example, 100° C. or higher.

Therefore, according to this configuration of the present disclosure, since the battery pack of the present disclosure includes the fire extinguishing unit 300 having the fire extinguishing valve 310 whose internal configuration is partially deformed due to a heated internal gas to open the output hole when the internal gas of the battery module 200 is heated over a predetermined temperature, even if a thermal runaway or fire occurs in some battery modules 200 of the battery pack, the fire extinguishing valve 310 may immediately supply the fire extinguishing agent into the battery module 200 due to the influence of the heated temperature caused by the thermal runaway. In addition, at this time, even if the battery management system erroneously operates, the thermal runaway or fire may be stably extinguished by the fire extinguishing valve, without BMS control, thereby effectively enhancing the safety of the battery pack.

Moreover, in the present disclosure, when a thermal runaway or fire occurs in some of the plurality of battery modules 200, it is possible that only the fire extinguishing valve 310 is opened in some of the battery modules 200 so that the fire extinguishing agent is injected individually. For this reason, compared to the case where the fire extinguishing agent is injected into all battery modules 200, a larger amount of fire extinguishing agent may be injected into the battery modules 200 more quickly. Moreover, the fire extinguishing agent may be sprayed directly into the battery module 200, rather than to the outer side thereof, to effectively extinguish the fire and cool the battery module 200 where the thermal runaway occurs, thereby quickly extinguishing the fire.

In addition, the fire extinguishing valve 310 may further include an active valve 343 capable of controlling the valve to be opened or closed by receiving a signal from the fire extinguishing unit 300, in addition to the passive valve. More specifically, the active valve 343 may be a control valve, a motor-operated valve, a solenoid valve, or a pneumatic valve.

Moreover, the active valve 343 may be configured to supply the fire extinguishing agent from the fire extinguishing tank 320 to the battery module 200 having an internal temperature rising over a predetermined temperature. When the internal temperature of the battery module 200 rises over the predetermined temperature, a controller 350 may sense the internal temperature, and the active valve 343 may be actively opened by the controller 350. In this case, the controller 350 may be located on a battery module 200 located at an uppermost side among the plurality of battery modules 200.

The fire extinguishing unit 300 may include a controller 350. Specifically, the controller 350 may be configured to open the active valve 343 when the temperature sensor 360 senses a temperature over the predetermined temperature. For example, the controller 350 may be configured to transmit a signal for controlling the active valve 343. For example, the temperature sensor 360 may be a linear temperature sensor.

For example, the linear temperature sensor 360 may be configured to melt when a heat sensing material coated on two wires reaches a temperature higher over a reference temperature, to cause a short circuit between the two wires, thereby emitting a fire or overheat signal. For example, the heat sensing material may be a thermoplastic resin that melts at 70° C. to 100° C. For example, the thermoplastic resin may be a polyester resin or an acrylic resin. Additionally, the linear temperature sensor 360 may further include an insulating coating material configured to surround the heat sensing material. The coating material may include polyvinyl chloride.

In addition, the linear temperature sensor 360 may have a structure extending linearly along at least two battery modules 200 arranged in one direction. For example, as shown in FIG. 2, the battery pack 400 may include eight battery modules 200 arranged in a vertical direction. The linear temperature sensor 360 may be configured so that one end thereof is connected to the controller 350 and extends downward along the eight battery modules 200 arranged in the vertical direction, and the other end thereof is connected to a resistor 365 at a distal end. At this time, a bracket (not shown) and a fixing buckle (not shown) may be used to partially fix the position of the linear temperature sensor 360.

Therefore, according to this configuration of the present disclosure, since the battery pack 400 includes the temperature sensor 360 linearly extending along at least two battery modules 200, it is possible to reduce the manufacturing cost of the battery pack.

That is, when a plurality of temperature sensors is applied in the prior art, a plurality of temperature sensors and separate signal wires for connecting the plurality of temperature sensors are required, which increases the manufacturing cost due to high material cost and long installation work. Meanwhile, the battery pack 400 of the present disclosure uses only one linear temperature sensor 360 to detect the temperature of the plurality of battery modules 200, so a separate signal wire is not required and easy installation is secured due to a light and flexible design. Thus, the manufacturing cost of battery pack 400 may be greatly reduced.

Moreover, the linear temperature sensor 360 is useful for setting a plurality of points for more accurate temperature sensing even for one battery module 200. Accordingly, in the present disclosure, it is possible to greatly reduce the failure rate in detecting the occurrence of fire in the battery module 200.

In addition, the fire extinguishing unit 300 may further include a smoke sensor 380 configured to sense a smoke discharged from the at least two battery modules 200. Specifically, the smoke sensor 380 may be located at an uppermost portion of the at least two battery modules 200 stacked in the vertical direction. That is, if a fire occurs in the battery module 200, the generated gas may be moved upward, so it is preferable that the smoke sensor 370 is located at the uppermost portion of the at least two battery modules 200.

In addition, the smoke sensor 380 may be configured to transmit a signal to the controller 350 of the fire extinguishing unit 300 when detecting smoke. The controller 350 may open the active valve 343 according to the received signal.

Figure 4:
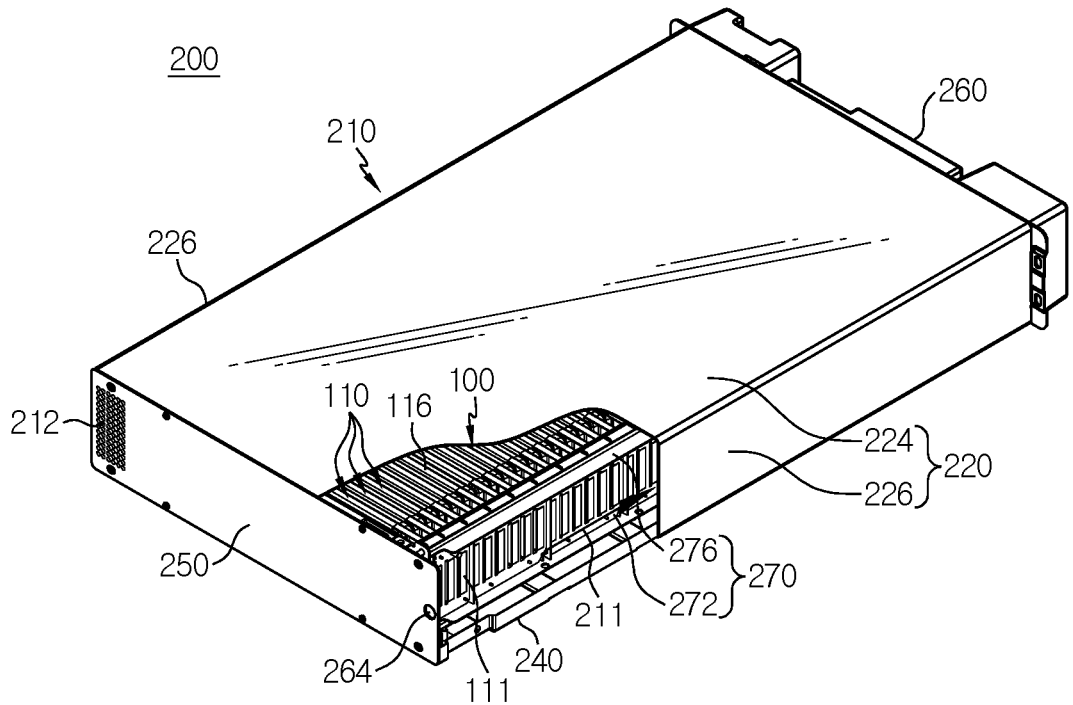
FIG. 4 is a rear perspective view schematically showing a battery module, employed at the battery pack according to an embodiment of the present disclosure.

FIG. 4 is a rear perspective view schematically showing a battery module, employed at the battery pack according to an embodiment of the present disclosure. Also, FIG. 5 is a perspective view schematically showing a cell assembly, employed at the battery pack according to an embodiment of the present disclosure.

Referring to FIGS. 4 and 5, the battery module 200 may include at least one cell assembly 100. The cell assembly 100 may have a plurality of secondary batteries 110 arranged in one direction. Here, the secondary battery 100 may be provided as a single cell unit.

The secondary battery 110 may be a pouch-type secondary battery 110. For example, as shown in FIG. 5, when viewed in the F direction of FIG. 1 (from the front), the two cell assembly 100 may be configured such that a plurality of pouch-type secondary batteries 110 are stacked side by side in the front and rear direction. For example, as shown in FIG. 5, one cell assembly 100 may include 21 pouch-type secondary batteries 110.

Meanwhile, in this specification, unless otherwise specified, the upper, lower, front, rear, left and right directions will be set based on when viewed in the F direction of FIG. 1.

In particular, the pouch-type secondary battery 110 may include an electrode assembly (not shown), an electrolyte solution (not shown), and a pouch 116.

Moreover, a positive electrode lead 111 and a negative electrode lead 112 may be formed at left and right ends of the secondary battery 110, which are opposite to each other based on the center of the secondary battery 110. That is, the positive electrode lead 111 may be provided at one end (a right end) of the secondary battery 110 based on the center thereof. In addition, the negative electrode lead 112 may be provided at the other end (a left end) of the secondary battery 110 based on the center thereof.

However, the battery module 200 according to the present disclosure is not limited to the pouch-type secondary battery 110 described above, and various kinds of secondary batteries 110 known at the time of filing of this application may be employed.

Meanwhile, referring to FIG. 4 again, the battery module 200 may further include a bus bar assembly 270. Specifically, the bus bar assembly 270 may include at least one bus bar 272 configured to electrically connect the plurality of secondary batteries 110 to each other and at least two bus bar frame 276 configured to mount the at least at least one bus bar 272 at an outer side. The at least two bus bar frame 276 may be provided at left and right sides of the cell assembly 100, respectively.

Meanwhile, the module housing 210 may have an inner space to accommodate the cell assembly 100 therein. Specifically, when viewed directly in the F direction of FIG. 1, the module housing 210 may include an upper cover 220, a base plate 240, a front cover 260, and a rear cover 250.

Specifically, the base plate 240 may have an area larger than the size of a bottom surface of the at least two cell assemblies 100 so as to mount the at least two cell assemblies 100 to an upper portion thereof. The base plate 240 may have a plate shape extending in a horizontal direction.

In addition, the upper cover 220 may include an upper wall 224 and a sidewall 226 extending downward from the upper wall 224. The upper wall 224 may have a plate shape extending in a horizontal direction to cover an upper portion of the cell assembly 100. The sidewall 226 may have a plate shape extending downward from both left and right ends of the upper wall 224 to cover both left and right sides of the cell assembly 100.

In addition, the sidewall 226 may be coupled to a portion of the base plate 240. For example, as shown in FIG. 5, the upper cover 220 may include an upper wall 224 having a plate shape extending in the front, rear, left and right directions. The upper cover 220 may include two sidewalls 226 extending downward from both left and right ends of the upper wall 224, respectively. Further, lower ends of the two sidewalls 226 may be configured to be coupled with both left and right ends of the base plate 240, respectively. In this case, the coupling method may be a male and female coupling method or a welding method.

Moreover, the front cover 260 may be configured to cover the front side of the plurality of secondary batteries 110. For example, the front cover 260 may have a plate larger than the size of the front surface of the plurality of secondary batteries 110. The plate may be erected in a vertical direction.

In addition, the rear cover 250 may be configured to cover the rear side of the cell assembly 100. For example, the rear cover 250 may have a plate shape larger than the size of the rear surface of the plurality of secondary batteries 110.

Figure 6:
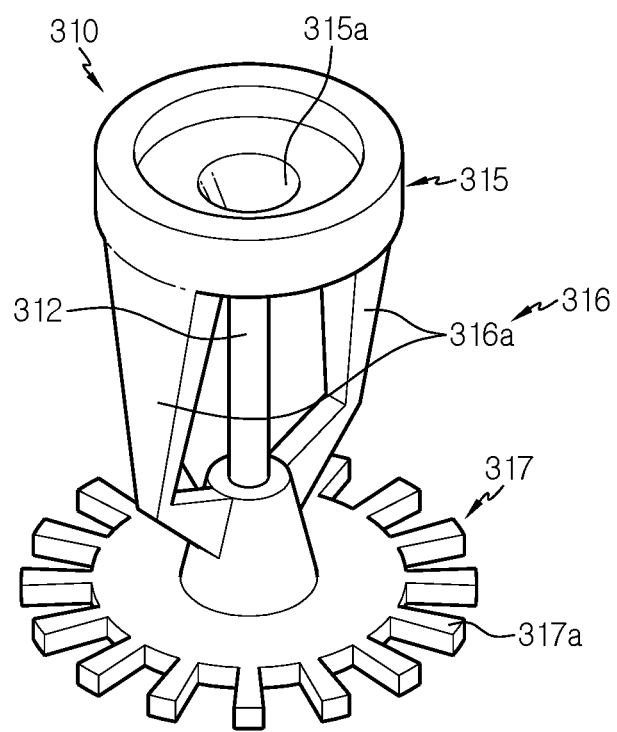
FIG. 6 is a perspective view schematically showing a fire extinguishing valve, employed at the battery pack according to an embodiment of the present disclosure.

FIG. 6 is a perspective view schematically showing a fire extinguishing valve, employed at the battery pack according to an embodiment of the present disclosure. Also, FIG. 7 is a sectional view schematically showing the fire extinguishing valve, employed at the battery pack according to an embodiment of the present disclosure.

Figure 7:
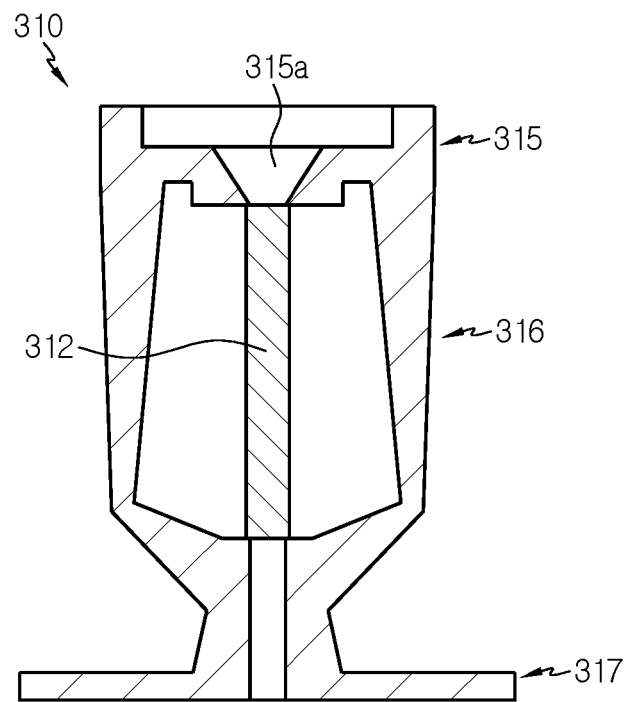
FIG. 7 is a sectional view schematically showing the fire extinguishing valve, employed at the battery pack according to an embodiment of the present disclosure.

Referring to FIGS. 6 and 7, a top end of a top portion 315 of the fire extinguishing valve 310 may be connected to the distribution pipe 336. In addition, the fire extinguishing valve 310 may include a glass bulb 312 configured to seal an output hole 315a of the fire extinguishing valve 310 at ordinary time. However, if the glass bulb 312 is exposed to the internal gas of the battery module 200 over the predetermined temperature, at least a part of the glass bulb 312 is damaged to open the output hole 315a. In addition, the glass bulb 312 may have a predetermined liquid (not shown) contained therein. For example, the liquid may have a property that the volume increases as the temperature rises. The glass bulb 312 may be configured to seal a passage (output hole) through which the fluid of the fire extinguishing valve 310 flows.

In addition, the glass bulb 312 may be configured to be broken due to volume expansion of the predetermined liquid at a predetermined temperature, for example, 70□C to 100□C or above. For example, the liquid may be water. That is, if the fire extinguishing valve 310 is located inside the battery module 200, when the internal temperature of the battery module 200 rises over the predetermined temperature, the glass bulb 312 closing the passage 347e-through which the fire extinguishing agent of the fire extinguishing valve 310 flows may be at least partially broken to open the output hole 315a of the fire extinguishing valve 310. Moreover, the fire extinguishing valve 310 may further include a dispersion unit 317 configured to disperse the fire extinguishing agent discharged from the output hole 315a in all directions. The dispersion unit 317 may be configured to disperse the fire extinguishing agent discharged from the output hole 315a.

More specifically, the fire extinguishing valve 310 may include a top portion 315, a connection portion 316, and a dispersing protrusion 317a.

The top portion 315 may have a tubular shape configured such that the output hole 315a of the valve is formed therein and the output hole 315a is sealed by one end of the glass bulb 312. In this case, the tubular shape may have a pipe diameter continuously decreasing toward the glass bulb 312.

The connection portion 316 may extend from the top portion 315 to the side of the glass bulb 312 to cover the glass bulb 312, and two arms 316a of the connection portion 316 may extend in one direction from the top portion 315 and be gathered to the center again to fix the other end of the glass bulb 312. At this time, the other end of the glass bulb 312 may be located in a portion where the two arms of the connection portion 316 are gathered.

The dispersing protrusion 317a may have a shape that is divided into a plurality of horizontal parts from the end of the body of the dispersion unit 317 to extend at regular intervals so that the fire extinguishing agent discharged from the output hole 315a is dispersed and moved.

Therefore, according to this configuration of the present disclosure, since the fire extinguishing valve 310 of the present disclosure includes a glass bulb 312 configured to seal the output hole 315a but configured to be at least partially broken when exposed to an internal gas of the battery module 200 over a predetermined temperature to open the output hole 315a and a dispersion unit 317 configured to disperse the fire extinguishing agent discharged from the output hole 315a, it is possible to open the fire extinguishing valve 310 with a fast response speed by the high internal temperature of the battery module 200 where a thermal runaway or fire occurs. Moreover, since the dispersion unit 317 evenly sprays the supplied fire extinguishing agent, the extinguishing ability may be effectively increased.

Figure 8:
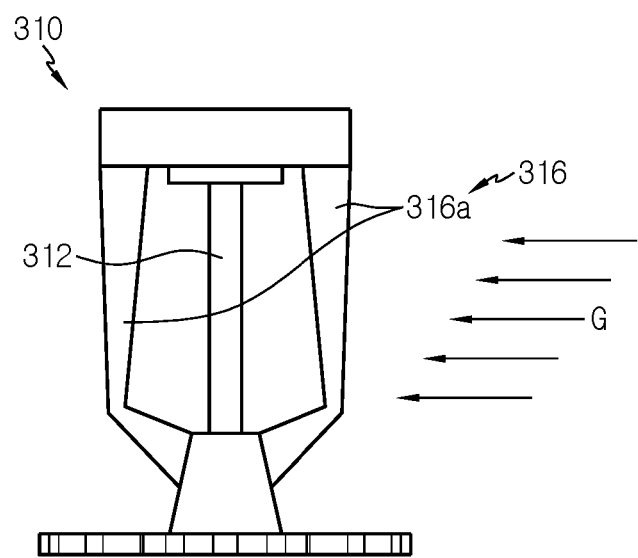
FIG. 8 is a front perspective view schematically showing an arrangement of the fire extinguishing valve, employed at a battery pack according to a comparative example of the present disclosure.

FIG. 8 is a front perspective view schematically showing an arrangement of the fire extinguishing valve, employed at a battery pack according to a comparative example of the present disclosure. Also, FIG. 9 is a side view schematically showing an arrangement of the fire extinguishing valve, employed at the battery pack according to an embodiment of the present disclosure.

Figure 9:
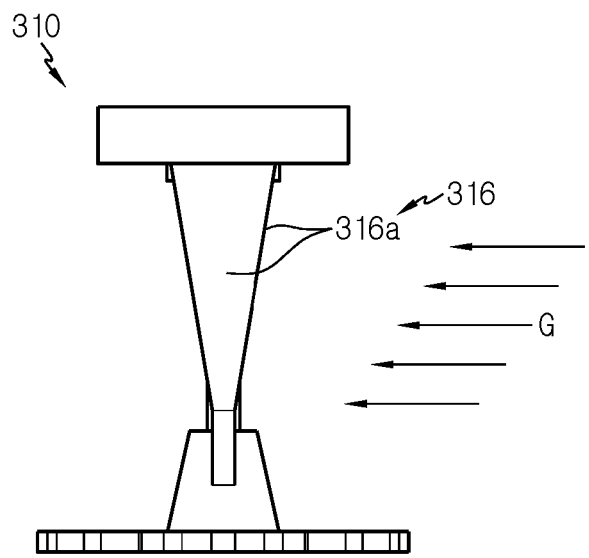
FIG. 9 is a side view schematically showing an arrangement of the fire extinguishing valve, employed at the battery pack according to an embodiment of the present disclosure.

Referring to FIGS. 8 and 9, the glass bulb 312 provided to the fire extinguishing valve 310 of the present disclosure may be configured to be exposed to a high-temperature gas caused by a thermal runaway or fire of the cell assembly 100. For example, the glass bulb 312 may be configured to face the high-temperature gas. Moreover, the connection portion 316 may be rotatably disposed so that the glass bulb 312 does not block the flow of the high-temperature gas by the connection portion 316 (an arm part) of the fire extinguishing valve 310.

For example, as shown in FIG. 8, the fire extinguishing valve 310 according to a comparative example of the present disclosure may be located so that the angle formed between the arm part 316a of the connection portion 316 of the fire extinguishing valve 310 and the glass bulb 312 becomes 0 degrees, based on the direction in which the glass bulb 312 and the high-temperature gas face each other. That is, if the glass bulb 312 faces the high-temperature gas at the front, the arm part 316a of the connection portion 316 may be located at the front.

For example, as shown in FIG. 9, the fire extinguishing valve 310 according to an embodiment of the present disclosure may be located so that the angle between the arm part 316a of the connection portion 316 and the glass bulb 312 is 90 degrees, based on the direction in which the glass bulb 312 and the high-temperature gas face each other. That is, if the glass bulb 312 faces the high-temperature gas at the front, the arm part 316a of the connection portion 316 may be located at the side.

Figure 10:
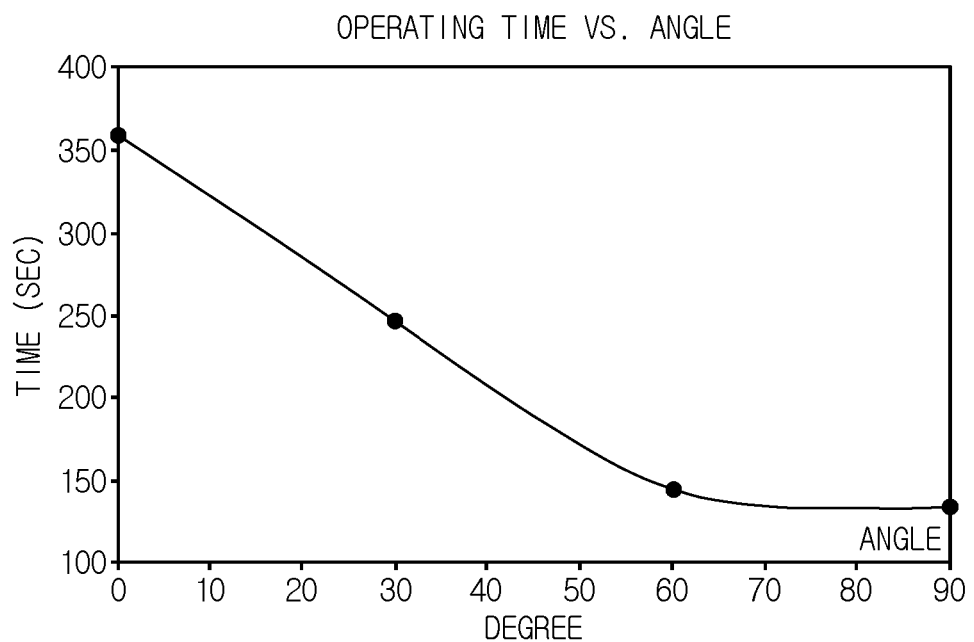
FIG. 10 is a graph showing an operating time according to the arrangement of the fire extinguishing valve, employed at the battery pack according to an embodiment of the present disclosure.

FIG. 10 is a graph showing an operating time according to the arrangement of the glass bulb, employed at the battery pack according to an embodiment of the present disclosure.

Referring to FIG. 10 along with FIGS. 8 and 9, if the arm part 316a of the connection portion 316 of the fire extinguishing valve 310 is located to have an angle of 0 degree with the glass bulb 312 based on the direction in which the glass bulb 312 and the high-temperature gas G face each other, like the fire extinguishing valve 310 of FIG. 8, the operating time of the fire extinguishing valve 310 is longest. That is, the time required to open the fire extinguishing valve 310 is shortest for the fire extinguishing valve 310 arranged as shown in FIG. 8.

Conversely, if the arm part 316a of the connection portion 316 of the fire extinguishing valve 310 is located to have an angle of 90 degree with the glass bulb 312 based on the direction in which the glass bulb 312 and the high-temperature gas G face each other, like the fire extinguishing valve 310 of FIG. 9, the operating time of the fire extinguishing valve 310 is shortest. That is, the angle of the arm part 316a of the connection portion 316 of the fire extinguishing valve 310 is preferably 60 to 90 degrees based on the direction in which the glass bulb 312 and the high-temperature gas G face each other.

As above, the fire extinguishing valve 310 may be opened fastest when the arm part 316a of the connection portion 316 is disposed not to cause interference when the glass bulb 312 faces the high-temperature gas G, like the fire extinguishing valve 310 according to an embodiment of the present disclosure. Accordingly, in the present disclosure, when a fire or thermal runaway occurs at the battery module 200, the fire or thermal runaway may be quickly extinguished and suppressed using the fire extinguishing valve 310.

Figure 11:
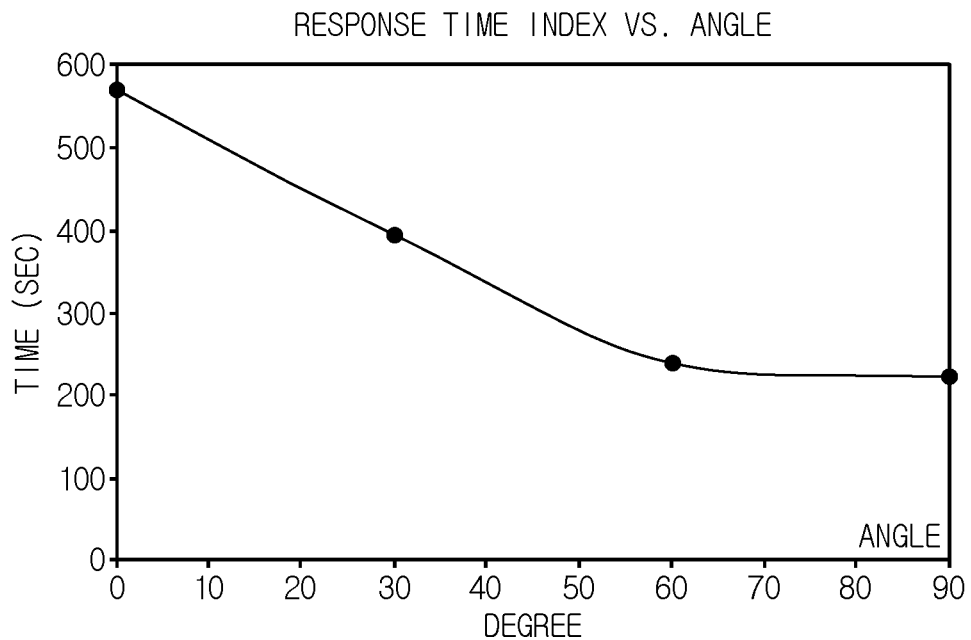
FIG. 11 is a graph showing a response time index according to the arrangement of the fire extinguishing valve, employed at the battery pack according to an embodiment of the present disclosure.

FIG. 11 is a graph showing a response time index according to the arrangement of the glass bulb, employed at the battery pack according to an embodiment of the present disclosure.

Referring to FIG. 11 along with FIGS. 8 and 9, if the arm part 316a of the connection portion 316 of the fire extinguishing valve 310 is located to have an angle of 0 degree with the glass bulb 312 based on the direction in which the glass bulb 312 and the high-temperature gas G face each other, like the fire extinguishing valve 310 of FIG. 8, the response time index of the fire extinguishing valve 310 is greatest. That is, a longest time is required to open the fire extinguishing valve 310. Here, the 'response time index' is a criterion to measure how quickly the fire extinguishing valve reaches its opening temperature according to heat transfer.

Conversely, if the arm part 316a of the connection portion 316 of the fire extinguishing valve 310 is located to have an angle of 90 degree with the glass bulb 312 based on the direction in which the glass bulb 312 and the high-temperature gas G face each other, like the fire extinguishing valve 310 of FIG. 9, the response time index of the fire extinguishing valve 310 is smallest. That is, the time required for opening the fire extinguishing valve 310 is shortest.

As above, the fire extinguishing valve 310 may be opened fastest when the arm part 316a of the connection portion 316 is disposed not to cause interference when the glass bulb 312 faces the high-temperature gas G, like the fire extinguishing valve 310 according to an embodiment of the present disclosure. Accordingly, in the present disclosure, when a fire or thermal runaway occurs at the battery module 200, the fire or thermal runaway may be quickly extinguished and suppressed using the fire extinguishing valve 310.

Figure 12:
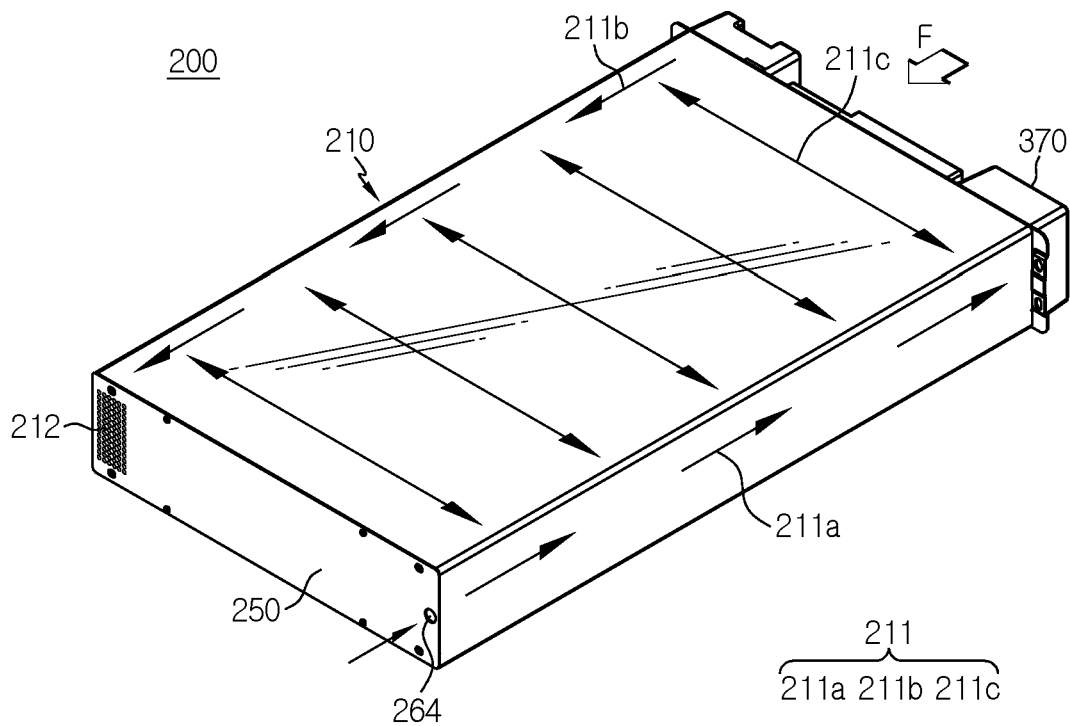
FIG. 12 is a rear perspective view schematically showing the battery module, employed at the battery pack according to an embodiment of the present disclosure.

FIG. 12 is a rear perspective view schematically showing the battery module, employed at the battery pack according to an embodiment of the present disclosure.

Referring to FIG. 12 along with FIG. 4, the module housing 210 may include a gas passage 211 located inside the module housing 210 and configured to discharge the gas generated from the cell assembly 100 to the outside. That is, the module housing 210 may have a gas passage 211 through which the gas generated from the cell assembly 100 flows. Here, the gas passage 211 may be a space elongated in the front and rear direction to communicate with the outside. The gas passage 211 may be provided at one of the left and right sides or both left and right sides of the cell assembly 100.

More specifically, the gas passage 211 may be a space between the upper or lower portion of the cell assembly 100 and the module housing 210. That is, the gas generated from the cell assembly 100 accommodated in the battery module 200 may move to both left and right sides of the cell assembly 100 through the gas passage 211c located at the upper or lower portion of the cell assembly 100 and be discharged out through a plurality of gas discharge holes 212 formed at the end of the gas passage 211b and perforated to communicate with the outside of the battery module 200.

An inlet hole 264 may be provided at the rear cover 250 located at the rear side of each of the at least two battery modules 200 so that the fire extinguishing agent is introduced therethrough. The inlet hole 264 may be positioned to communicate with the gas passage 211. That is, the inlet hole 264 may be configured to communicate with the gas passages 211 located on both left and right sides based on the cell assembly 100.

For example, the fire extinguishing valve 310 may be inserted into the inlet hole 264 and located in a part of the gas passage 211 so that the glass bulb 312 is exposed to the gas generated from the cell assembly 100.

That is, since the inlet hole 264 is in communication with the gas passage 211, the glass bulb 312 of the fire extinguishing valve 310 may be inserted into the inlet hole 264 so as to be exposed to the gas generated from the cell assembly 100.

Accordingly, according to this configuration of the present disclosure, since at least a part of the fire extinguishing valve 310 is located in a part of the gas passage 211 so that the glass bulb 312 is exposed to the gas generated from the cell assembly 100, when a thermal runaway or fire occurs at the cell assembly 100, it is possible to effectively receive heat transfer from the high-temperature air or gas moving along the gas passage 211, so that the glass bulb 312 of the fire extinguishing valve 310 bursts quickly to take a fire extinguishing action fast.

Referring to FIG. 12 along with FIG. 1, the battery module 200 may include a blower 370 and a gas discharge hole 212. When viewed in the F direction of FIG. 1, the blower 370 may be mounted at a front end of the module housing 210 and configured to introduce an external air into the module housing 210. The blower 370 may include a blowing fan configured to rotate by receiving power.

In addition, the gas discharge hole 212 may have a plurality of openings connected to the gas passage 211 and perforated to communicate the inside with the outside. When viewed in the F direction of FIG. 1, the gas discharge hole 212 may be formed at a rear end of the module housing 210. For example, the gas discharge hole 212 may be provided in the rear cover of the module housing 210.

Moreover, the gas passage 211 may include a supply portion 211a and a discharge portion 211b. Specifically, the supply portion 211a may be located at one of left and right sides of the cell assembly 100. For example, the supply portion 211a may be located at the left side of the cell assembly 100, when viewed in the F direction of FIG. 1. The supply portion 211a may be configured such that an external air introduced by the blower 370 moves to the rear end of the module housing 210. That is, the blower 370 may be configured to input an external air to push the internal gas of the battery module 200 to the rear end of the supply portion 211a.

In addition, the discharge portion 211b may be located at the other of the left and right sides of the cell assembly 100. For example, the discharge portion 211b may be located at the right side of the cell assembly 100, when viewed in the F direction of FIG. 12. The discharge portion 211b may be configured such that the external air introduced by the blower 370 moves to the gas discharge hole 212. That is, the discharge portion 211b may be configured to communicate with the gas discharge hole 212.

Figure 13:
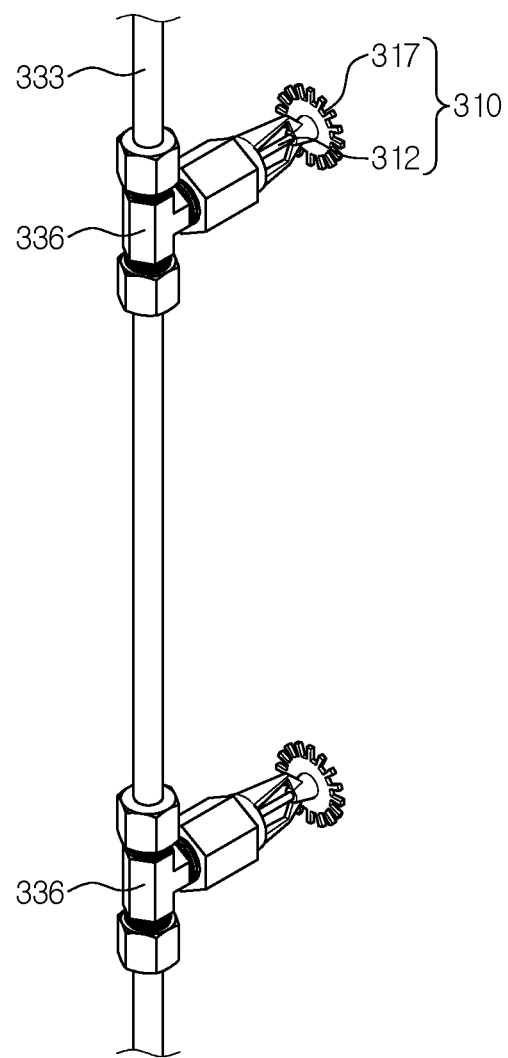
FIG. 13 is a partial perspective view schematically showing a portion of the battery pack according to an embodiment of the present disclosure.

FIG. 13 is a partial perspective view schematically showing a portion of the battery pack according to an embodiment of the present disclosure. Here, in FIG. 13, only the common pipe, the distribution pipe, and the fire extinguishing valve 310 provided at a terminal end of the distribution pipe are shown.

Referring to FIG. 13 along with FIG. 12, the glass bulb 312 included in the fire extinguishing valve 310 may be located in a part of the supply portion 211a or the discharge portion 211b inside the battery module 200. For example, as shown in FIG. 13, the fire extinguishing valve 310 may be disposed to protrude toward the inside of the battery module 200. At least a part of the fire extinguishing valve 310 may be inserted into the module housing 210 at the rear of the battery module 200. For example, as shown in FIG. 13, when viewed in the F direction of FIG. 12, the glass bulb 312 and the dispersion unit 317 of the fire extinguishing valve 310 may be inserted through the inlet hole 264 to be located at the rear end of the supply portion 211a of the gas passage 211.

That is, the high-temperature gas generated inside the battery module 200 may move to the fire extinguishing valve 310 located at the rear end of the supply portion 211a of the gas passage 211 by the external air introduced by the blower 370. Accordingly, the glass bulb 312 of the fire extinguishing valve 310 may quickly open the valve by contacting the pushed high-temperature gas.

Moreover, in the fire extinguishing valve 310 inserted into the module housing 210, if a thermal runaway or fire occurs at the cell assembly 100 of the battery module 200, the glass bulb 312 may be broken by the high-temperature gas generated inside to open the output hole. At this time, the fire extinguishing agent supplied to the rear end of the supply portion 211a moves to the front of the supply portion 211a, and some of the fire extinguishing agent moves to the discharge portion 211b through the cell assembly 100.

Therefore, according to this configuration of the present disclosure, since at least a part of the fire extinguishing valve 310 of the present disclosure is located in a part of the supply portion 211a or the discharge portion 211b, the fire extinguishing valve 310 may easily contact the high-temperature gas pushed by the external air introduced by the blower 370, thereby exhibiting quick extinguishing ability against a thermal runaway or fire of battery module 200. Accordingly, the safety of the battery pack may be effectively increased.

Figure 14:
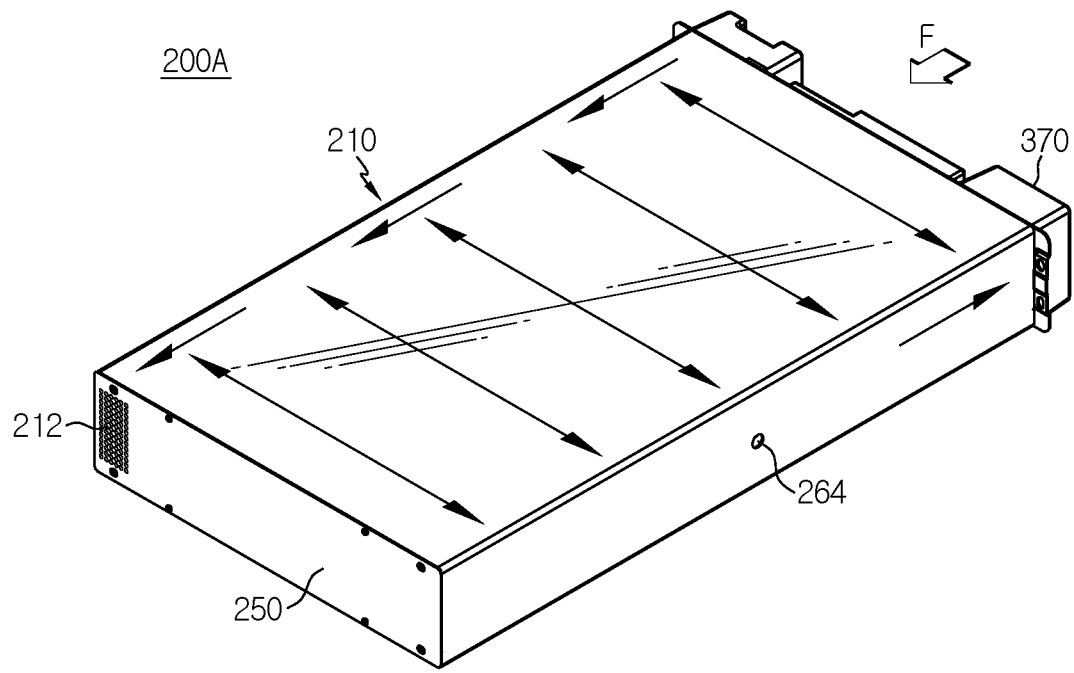
FIG. 14 is a rear perspective view schematically showing the battery module, employed at a battery pack according to another embodiment of the present disclosure.

FIG. 14 is a rear perspective view schematically showing the battery module, employed at a battery pack according to another embodiment of the present disclosure. Also, FIG. 15 is a sectional view schematically showing an inner configuration of the battery module of FIG. 14.

Figure 15:
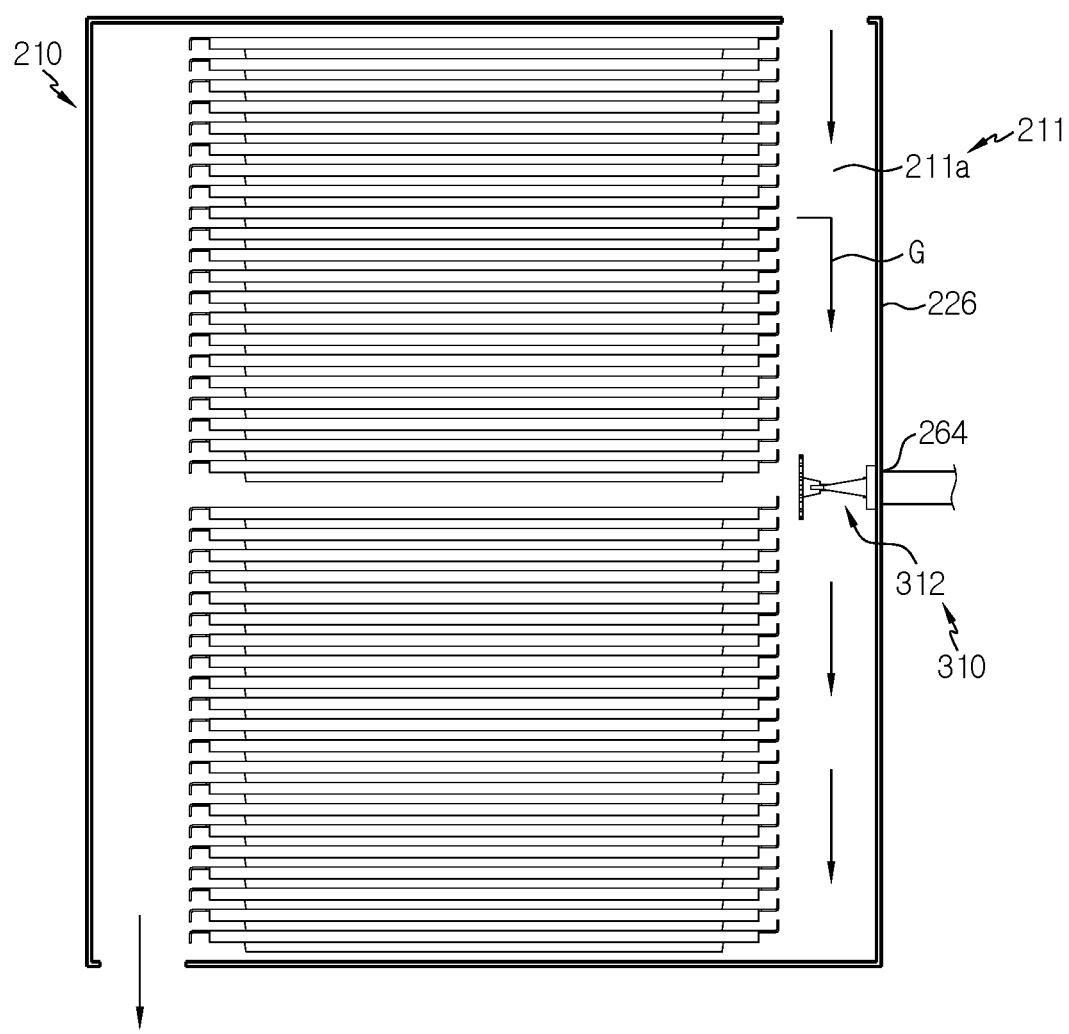
FIG. 15 is a sectional view schematically showing an inner configuration of the battery module of FIG. 14.

Referring to FIGS. 14 and 15 along with FIG. 6, in a battery module 200A according to another embodiment of the present disclosure, the inlet hole 264 may can be located on a left side of the module housing 210, when viewed in the F direction, differently from the battery module 200 shown in FIG. 12. For example, as shown in FIG. 14, the inlet hole 264 may be provided to the sidewall 226 (FIG. 4) of the upper cover 220 (FIG. 4) of the module housing 210. In addition, the inlet hole 264 may be located at the center of the sidewall 226 of the upper cover 220 in the front and rear direction.

In addition, the glass bulb 312 of the fire extinguishing valve 310 may be located in the middle of the supply portion 211a (FIG. 12) of the gas passage 211. The glass bulb 312 of the fire extinguishing valve 310 may be inserted into the module housing 210 at one of left and right sides of the battery module 200A. For example, as shown in FIG. 15, the fire extinguishing valve 310 may be inserted through the inlet hole 264 provided at the side of the module housing 210 and be located in the middle of the supply portion 211a (FIG. 12) of the gas passage 211 in the front and rear direction.

Therefore, according to this configuration of the present disclosure, since the fire extinguishing valve 310 is located in the middle of the supply portion 211a of the gas passage 211 and inserted into the module housing 210 at one of the left and right sides of the battery module 200A, the fire extinguishing agent may be sprayed to spread in the front and rear direction through the dispersion unit 317 of the fire extinguishing valve 310. Since the fire extinguishing agent is sprayed evenly in this way, it is possible to effectively prevent a thermal runaway or flame of the cell assembly 100 from propagating.

Moreover, since the glass bulb 312 of the fire extinguishing valve 310 inserted at one of the left and right sides may contact the high-temperature gas G flowing along the supply portion 211a of the gas passage 211 without any interference, the reaction operating time of the fire extinguishing valve 310 may be effectively reduced. Accordingly, the battery pack of the present disclosure may exhibit quick fire extinguishing ability.

Figure 16:
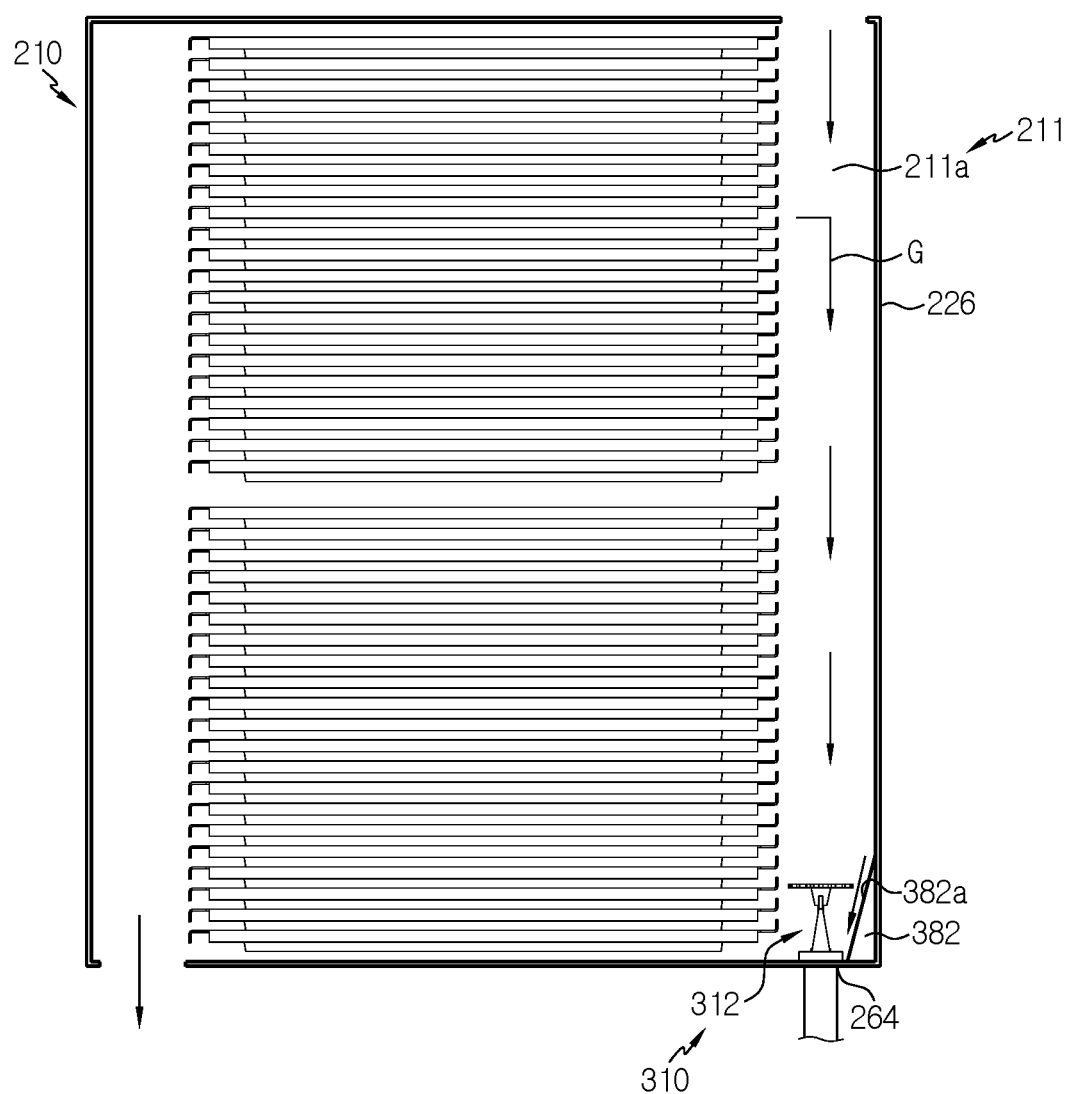
FIG. 16 is a sectional view schematically showing an inner configuration of a battery module, employed at a battery pack according to still another embodiment of the present disclosure.

FIG. 16 is a sectional view schematically showing an inner configuration of a battery module, employed at a battery pack according to still another embodiment of the present disclosure.

Referring to FIG. 16 along with FIG. 6, a battery module 200B of a battery pack according to another exemplary embodiment may further include a guide block 382 inside the module housing 210. The guide block 382 may have an inclined surface 382a that guides the gas G generated from the cell assembly 100 to flow while facing the exposed portion of the glass bulb 312. For example, the guide block 382 may have a triangular shape on a plane. For example, as shown in FIG. 16, the high-temperature gas G flowing from the front to the rear of the supply portion 211a of the gas passage 211 may flow along the inclined surface 382a of the guide block 382, so that the flow of the gas G is guided toward the glass bulb 312 of the fire extinguishing valve 310.

Therefore, according to this configuration of the present disclosure, since the battery module 200B includes the guide block 382 having the inclined surface 382a that guides the gas G generated from the cell assembly 100 to flow while facing the exposed portion of the glass bulb 312, it is possible to effectively reduce that the contact of the glass bulb 312 of the fire extinguishing valve 310 with the high-temperature gas G is disturbed by the connection portion 316. Accordingly, the fire extinguishing valve 310 may operate with high reliability, and the operating time may be effectively reduced.

Figure 17:
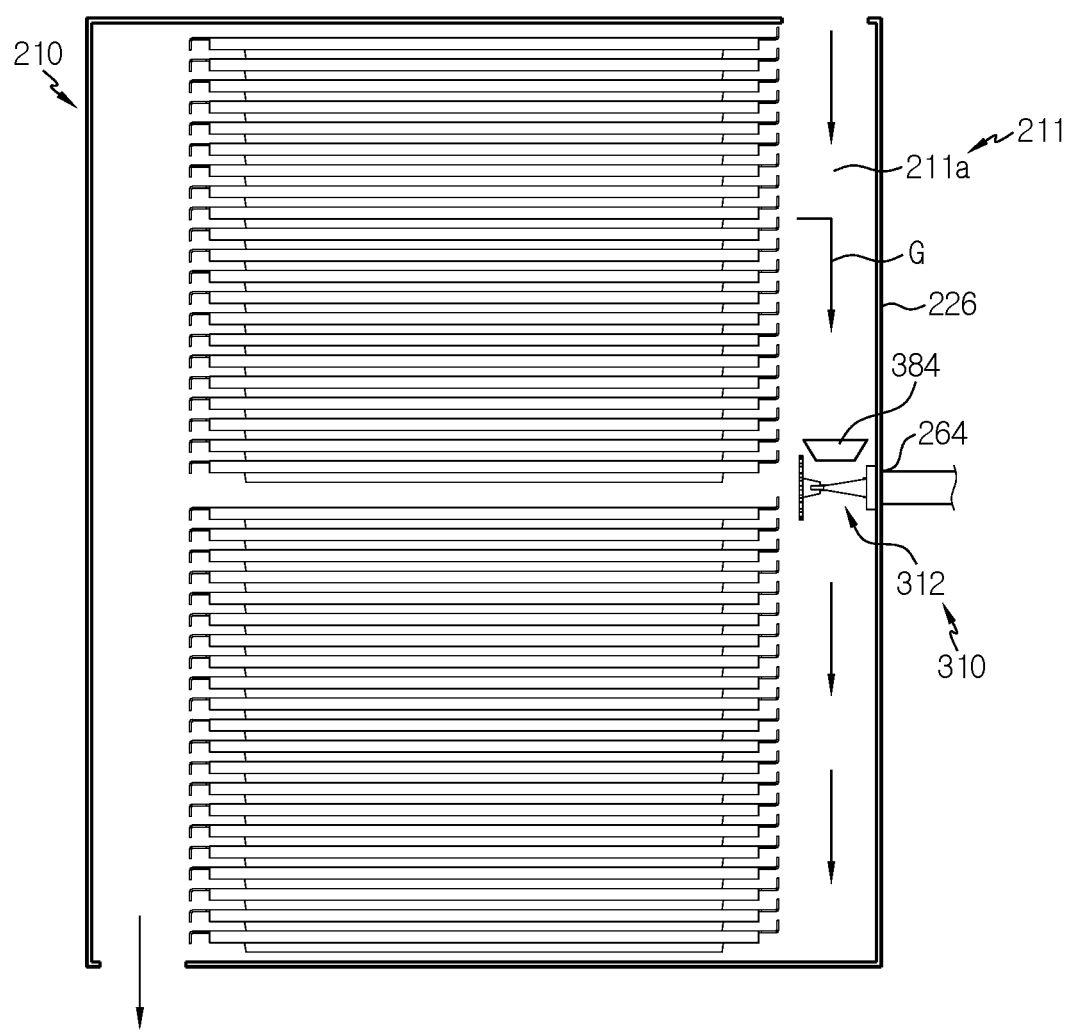
FIG. 17 is a sectional view schematically showing an inner configuration of the battery module, employed at the battery pack according to still another embodiment of the present disclosure.

FIG. 17 is a sectional view schematically showing an inner configuration of the battery module, employed at the battery pack according to still another embodiment of the present disclosure.

Referring to FIG. 17 along with FIG. 6, a battery module 200C according to another embodiment of the present disclosure may further include a pipe member 384 provided on the gas passage 211 and having a pipe diameter gradually decreasing in a direction along which the gas G flows, as compared with the battery module 200 of FIG. 12. The pipe member 384 may be configured to guide the gas G generated from the cell assembly 100 to be collected to the exposed portion of the glass bulb 312. At this time, the fire extinguishing valve 310 may be located in the middle of the supply portion 211a of the gas passage 211 and be inserted into the module housing 210 at one of left and right sides of the battery module 200C.

For example, as shown in FIG. 17, the pipe member 384 may be provided inside the battery module 200C at a position adjacent to the glass bulb 312 of the fire extinguishing valve 310 located at the center of the supply portion 211a of the gas passage 211 in the front and rear direction. The pipe member 384 may be shaped to have a pipe diameter gradually decreasing in a direction along which the gas flows so that the high-temperature gas G moving from the front end of the supply portion 211a to the rear end thereof is collected toward the glass bulb 312 provided to the fire extinguishing valve 310.

Therefore, according to this configuration of the present disclosure, since the pipe member 384 having a pipe diameter gradually decreasing in a direction along which the gas G flows is provided so that the gas G generated from the cell assembly 100 is collected to the exposed portion of the glass bulb 312, the gas G generated from the cell assembly 100 may be effectively collected to the glass bulb 312 of the fire extinguishing valve 310, so that the glass bulb 312 may be rapidly heated to a high temperature. Accordingly, the fire extinguishing valve 310 may operate with high reliability, and the operating time may be effectively reduced.

Figure 18:
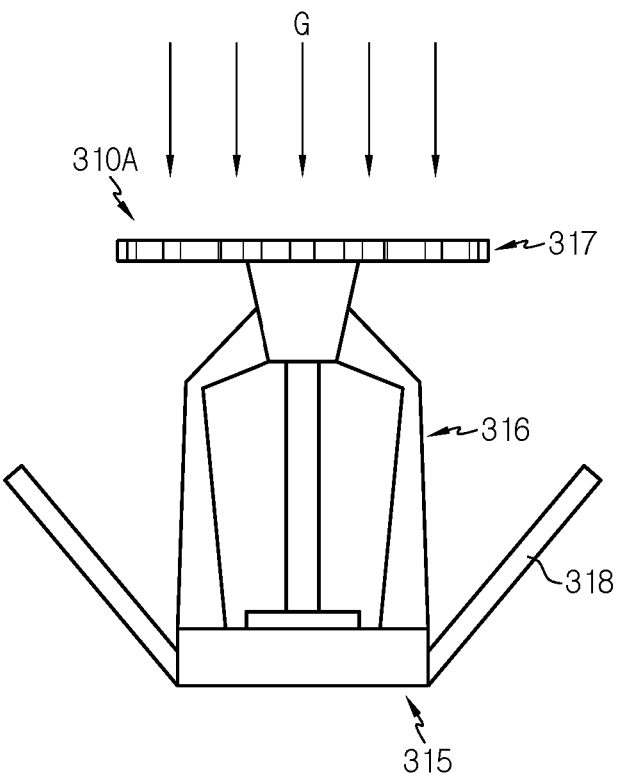
FIG. 18 is a plan view schematically showing a fire extinguishing valve, employed at the battery pack according to still another embodiment of the present disclosure.

FIG. 18 is a plan view schematically showing a fire extinguishing valve, employed at the battery pack according to still another embodiment of the present disclosure.

Referring to FIG. 18, a fire extinguishing valve 310A of a battery pack according to still another embodiment of the present disclosure may further include a gas guide 318, when compared with the fire extinguishing valve 310 shown in FIG. 6.

That is, the fire extinguishing valve 310A shown in FIG. 18 is the same as the fire extinguishing valve 310 shown in FIG. 6, except for the gas guide 318. Therefore, the top portion 315, the connection portion 316 and the dispersion unit 317, already described above will not be described again in detail.

In addition, the gas guide 318 may be configured such that a larger amount of high-temperature gas G comes into contact with the glass bulb 312. The gas guide 318 may be shaped to extend from the top portion 315 toward the dispersion unit 317. The gas guide 318 may have a structure that is widened in at least two of left, right, upper and lower directions. For example, as shown in FIG. 18, the gas guide 318 may extend from the left and right sides of the top portion 315 toward the dispersing protrusion 317a. The gas guide 318 may have a structure that is widened from the top portion 315 in the left, right, upper and lower directions.

Therefore, according to this configuration of the present disclosure, since the dispersion unit 314A of the fire extinguishing valve 310 according to the present disclosure includes the gas guide 318 extending from the top portion 315 toward the dispersion unit 317 and having a structure that is widened in at least two of left, right, upper and lower directions, the high-temperature gas G flowing to both sides of the glass bulb 312 may be guided to flow toward the glass bulb 312 without passing directly. Accordingly, the fire extinguishing valve 310 may operate with high reliability, and the operating time of the fire extinguishing valve 310 may be effectively reduced.

Figure 19:
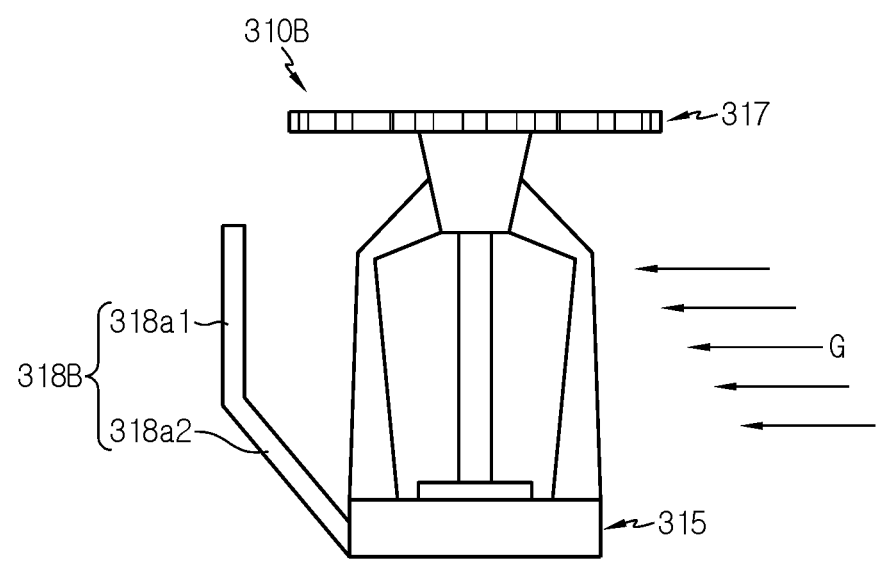
FIG. 19 is a plan view schematically showing a fire extinguishing valve, employed at the battery pack according to still another embodiment of the present disclosure.

FIG. 19 is a plan view schematically showing a fire extinguishing valve, employed at the battery pack according to still another embodiment of the present disclosure.

Referring to FIG. 19, a fire extinguishing valve 310B of a battery pack according to still another embodiment of the present disclosure may include a gas guide 318B having an extending structure extending from the top portion 315 toward the dispersing protrusion 317a. In addition, the gas guide 318B may extend to be inclined toward one of left and right sides of the body of the top portion 315. For example, as shown in FIG. 19, the gas guide 318B has an inclined structure 318a1 extending to be inclined from the right side of the top portion 315 to the left, and an extending structure 318a2 extending from an end of the inclined structure to the front where the dispersion unit 317 is located.

Therefore, according to this configuration of the present disclosure, since the fire extinguishing valve 310B of the present disclosure includes the gas guide 318B having the inclined structure 318a1 inclined to the left or right from the top portion 315 and the extending structure 318a2 extending from the end of the inclined structure 318a1 to the front where the dispersion unit 317 is located, it is possible to guide gas flow so that the high-temperature gas G flowing to one side of the glass bulb 312 does not pass directly but stagnates around the glass bulb 312. Accordingly, the fire extinguishing valve 310 may operate with high reliability, and the operating time of the fire extinguishing valve 310 may be effectively reduced.

Figure 20:
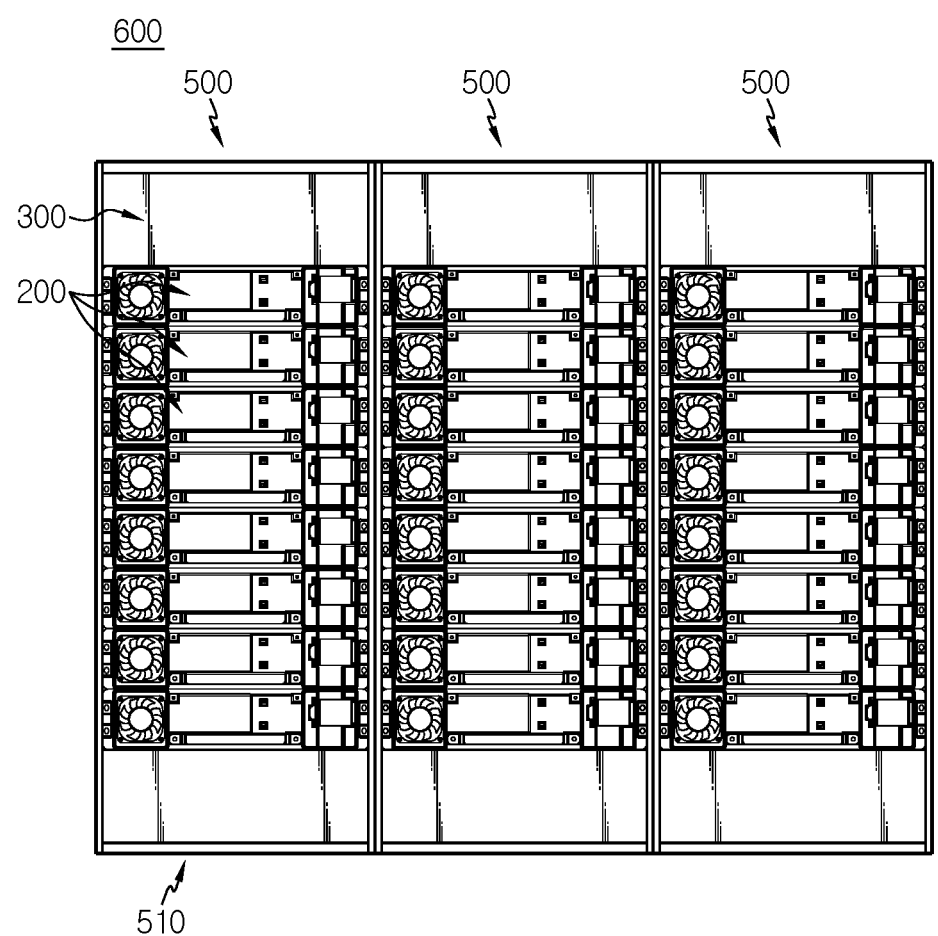
FIG. 20 is a front view schematically showing an energy storage system according to an embodiment of the present disclosure.

FIG. 20 is a front view schematically showing an energy storage system according to an embodiment of the present disclosure.

Referring to FIG. 20, a battery rack 500 according to an embodiment of the present disclosure may include the battery pack 400 and a rack case 510 for accommodating the battery pack 400. The rack case 510 may also be configured to accommodate a plurality of battery modules 200 of the battery pack 400 in a state of being vertically stacked. Inside the rack case 510, the battery module 200 may be mounted such that its lower surface is in a parallel shape to the horizontal surface.

Here, the horizontal direction may refer to a direction parallel to the ground when the battery module 200 is placed on the ground, and may also refer to at least one direction on a plane perpendicular to the upper and lower direction.

Moreover, the rack case 510 is configured to have at least one side openable, and the battery module 200 may be inserted into the inner space through the open side. However, the rack case 510 may also be configured to allow such an open side to be closed.

In addition, the battery rack 500 may further include another component such as a battery management system 530 (BMS) in or out of the rack case 510.

Meanwhile, an energy storage system 600 according to an embodiment of the present disclosure may include two or more battery racks 500. The two or more battery racks 500 may be arranged in one direction. For example, as shown in FIG. 12, the energy storage system 600 may be configured such that three battery racks 500 are arranged in one direction. In addition, the energy storage system 600 may have a separate central controller (not shown) capable of controlling charging and discharging of three battery racks 500.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery module | 100: cell assembly |
| 110: secondary battery | 210: module housing |
| 220, 224, 226: upper cover, upper wall, sidewall | |
| 240, 250, 260: base plate, rear cover, front cover | |
| 270: bus bar assembly | |
| 211: gas passage | 212: gas discharge hole |
| 264: inlet hole | |
| 300: fire extinguishing unit | 310: fire extinguishing valve |
| 320: fire extinguishing tank | 321: outlet hole |
| 330, 333, 336: pipe, common pipe, distribution pipe | |
| 312: glass bulb | 317: dispersion unit |
| 370: blower | 211a, 211b: supply portion, discharge portion |
| 382: guide block | 384: pipe member |
| 315, 316, 317, 318: top portion, connection portion, dispersion unit, gas guide | |
| 318a1, 318a2: inclined structure, extending structure | |
| 350: controller | |
| 400: battery pack | 500: battery rack |
| 510: rack case | |
| 600: energy storage system | |

INDUSTRIAL APPLICABILITY

The present disclosure relates to a battery pack. In addition, the present disclosure is available for industries associated with a large-scale energy storage system including a battery pack.

What is claimed is:
1. A battery pack, comprising:
at least one battery module having a cell assembly including a plurality of secondary batteries arranged in a first direction; and
a fire extinguisher comprising:
a fire extinguishing tank configured to contain a fire extinguishing agent;
a pipe connected to the fire extinguishing tank to supply the fire extinguishing agent from the fire extinguishing tank to the at least one battery module;
a fire extinguishing valve configured so that, when an internal gas of the at least one battery module is heated over a predetermined temperature, an inner configuration of the fire extinguishing valve is partially deformed by the heated internal gas to open an output hole of the fire extinguishing valve to supply the fire extinguishing agent from the fire extinguishing tank into the at least one battery module;
a top portion having the output hole so that the output hole is sealed by the glass bulb; and
a gas guide extending from the top portion, the gas guide having a first end connected to the top portion and a second free end.
2. The battery pack according to claim 1, wherein the fire extinguishing valve includes:
a glass bulb configured to seal the output hole, the glass bulb being at least partially broken to open the output hole when being exposed to the internal gas of the at least one battery module over the predetermined temperature; and a disperser configured to disperse the fire extinguishing agent discharged from the output hole.

3. The battery pack according to claim 2, wherein the at least one battery module includes:

a module housing having an inner space capable of accommodating the cell assembly; and a gas passage located inside the module housing and configured to discharge a gas generated from the cell assembly to outside of the module housing, wherein the glass bulb of the fire extinguishing valve is located in the gas passage.

4. The battery pack according to claim 3, wherein the at least one battery module further includes:

a blower mounted to a front end of the module housing and configured to introduce external air into the module housing; and a gas discharge hole formed at a rear end of the module housing and connected to the gas passage, wherein the gas passage includes:

a supply portion located at a first side of the cell assembly and configured to move the external air introduced by the blower to the rear end of the module housing; and a discharge portion located at a second side of the cell assembly and configured to move the external air introduced by the blower to the gas discharge hole, wherein at least a part of the fire extinguishing valve is located in the supply portion or the discharge portion.

5. The battery pack according to claim 4, wherein the fire extinguishing valve is located at a rear end of the supply portion of the gas passage and is at least partially inserted into the module housing at a rear of the at least one battery module.

6. The battery pack according to claim 5, wherein the fire extinguishing valve is located in a middle of the supply portion of the gas passage and inserted into the module housing at one of a first side and a second side of the at least one battery module.

7. The battery pack according to claim 5, wherein the battery module includes a guide block having an inclined surface for guiding the gas generated from the cell assembly to flow toward an exposed portion of the glass bulb.

8. The battery pack according to claim 5, wherein the at least one battery module includes a pipe member having a pipe diameter decreasing in a direction along which the gas flows so that the gas generated from the cell assembly is collected to an exposed portion of the glass bulb.

9. The battery pack according to claim 2, wherein the fire extinguishing valve includes:

an output hole in the top portion so that the output hole is sealed by the glass bulb;

a connection portion extending from the top portion to cover the glass bulb and configured to fix the glass bulb; and a plurality of dispersing protrusions extending from the disperser so that the fire extinguishing agent discharged from the output hole is dispersed and moved, wherein the gas guide widens in at least two of left, right, upper and lower directions.

10. The battery pack according to claim 3, further comprising a guide pipe in the gas passage, the guide pipe having a decreasing diameter, wherein a smaller end of the guide pipe is closer to the fire extinguisher than a larger end of the guide pipe.

11. The battery pack according to claim 1, wherein the fire extinguishing valve includes a top portion having an output hole, a disperser configured to disperse the fire extinguishing agent discharged from the output hole and a connection portion having a first end connected to the top portion and a second end connected to the disperser.

12. The battery pack according to claim 1, wherein the connection portion comprises two arms.

13. A battery rack, comprising:

a battery pack according to claim 1; and a rack case configured to accommodate the battery pack.

14. An energy storage system, comprising two or more battery racks according to claim 13.

* * * * *